United States Patent [19]

Price et al.

[11] Patent Number: 4,988,590
[45] Date of Patent: Jan. 29, 1991

[54] ULTRAFAST ROASTED COFFEE

[75] Inventors: Sankey E. Price, Goshen; Richard F. Kussin; Robert J. Fruhling, both of Cincinnati; Marva B. Harris, Westchester, all of Ohio

[73] Assignee: The Procter & Gamble Company, Cincinnati, Ohio

[21] Appl. No.: 789,927

[22] Filed: Oct. 21, 1985

Related U.S. Application Data

[63] Continuation-in-part of Ser. No. 621,937, Jun. 22, 1984, abandoned, which is a continuation-in-part of Ser. No. 516,414, Jul. 22, 1983, abandoned.

[51] Int. Cl.$^5$ ................................................ A23F 5/04
[52] U.S. Cl. .................................... 426/595; 426/467; 426/468
[58] Field of Search ............................... 426/594–595, 426/467, 468

[56] References Cited

U.S. PATENT DOCUMENTS

| | | |
|---|---|---|
| 2,443,620 | 6/1948 | Hubbard . |
| 2,497,501 | 2/1950 | Himmel et al. . |
| 2,505,325 | 4/1950 | Hubbard . |
| 2,581,148 | 1/1952 | Scull . |
| 3,122,439 | 2/1964 | McAllister et al. . |
| 3,149,976 | 9/1964 | Smith . |
| 3,189,460 | 6/1965 | Smith, Jr. . |
| 3,329,506 | 7/1967 | Smith, Jr. . |
| 3,595,668 | 7/1971 | Nutting et al. . |
| 4,169,164 | 9/1979 | Hubbard et al. . |
| 4,215,151 | 7/1980 | Rios et al. . |
| 4,322,447 | 3/1982 | Hubbard . |

FOREIGN PATENT DOCUMENTS

| | | |
|---|---|---|
| 457195 | 6/1949 | Canada . |
| 989246 | 5/1976 | Canada . |

OTHER PUBLICATIONS

"New Roasting Process for Coffee Increases Yield Per Bean by 20%", *Food Engineering*, 60–61 (1978).
Shibamoto, T., "Application of HPLC for Evaluation of Coffee Flavor Quality", *Quality of Foods and Beverages*, vol. 2, Academic Press, NY, pp. 311–334 (1981).
Milleville, H. P., Ed., "Slash Roasting Time 90 Percent", *Food Processing*, pp. 67–69 (Nov. 1962).
"Jetzone Coffee Roaster Uses Fluidized Principle to Shorten Roast Time", *World Coffee & Tea*, pp. 32–33 (Dec. 1981).
*Tea and Coffee Trade Journal*, 592–593 (1912).

*Primary Examiner*—Joseph M. Golian
*Attorney, Agent, or Firm*—Eric W. Guttag; Richard C. Witte

[57] ABSTRACT

Disclosed herein is a coffee product which when brewed is characterized by having a reduced bitterness and improved freshness retention or brew holding quality. The coffee product is produced by an ultrafast roasting process wherein a blend of green coffee beans is roasted to a specific color preferably using a fluidized bed roaster at temperatures of from about 550° F. (288° C.) to about 750° F. (399° C.) for 30 to 120 seconds. The roasted coffee is quenched with air or inert gas, and ground or flaked.

23 Claims, 3 Drawing Sheets

ULTRAFAST ROASTED COFFEE

RELATED APPLICATION

This is a continuation-in-part application of Ser. No. 621,937, filed June 22, 1984, abandoned as of the filing date of this application, which is a continuation-in-part application of Ser. No. 516,414, filed July 22, 1983, now abandoned.

TECHNICAL FIELD

This invention relates to an improved coffee product having increased extractability which when brewed is characterized by reduced brew bitterness and improved brew holding quality or freshness retention on heating. This invention also relates to a method for the preparation of the improved coffee product.

BACKGROUND OF THE PRIOR ART

In order to develop the aroma and flavor of the green coffee bean, the coffee must be roasted. Over the years various techniques of roasting coffee to improve the flavor, the extractability and the aroma have been developed. These include both batch processes where coffee is roasted in portions and then cooled or quenched, as well as continuous roasting processes where coffee is continuously fed to a roaster and cooling unit.

To achieve proper color development, the roasting process must be carefully controlled. Green coffee must be heated to a temperature above 300° F. (149° C.) for roasting to occur. In typical commercial processes the green coffee is roasted to a temperature from about 400° F. (204° C.) to about 450° F. (232° C.) in a period of 3 to 15 minutes. The length of time the coffee is heated affects the product density, moisture content and extractability. A fast-roasted coffee, i.e. roasted in less than 5 minutes, is generally less dense than longer roasted beans because the cell structure of the bean is expanded to a greater degree. Fast-roasted coffees also generally provide a larger yield of brew solids, i.e. they are more extractable than coffee which is roasted more slowly. This is because the greater expansion of the coffee bean cell structure renders the internal coffee bean cell walls more porous, thus allowing easier entry of brewing water into the cells and easier egress of the dissolved brew solids out of the cells.

One technique of fast-roasting coffee has been fluidized bed roasting wherein the coffee can be roasted at times of from about 30 seconds to 3 minutes. Canadian Patent No. 989,246, issued to Bergeron & Schlichter (1976) describes a coffee which has been air fluidized bed roasted in from 30 seconds to 3 minutes. The coffee beans are roasted at a bed temperature of 550° to 650° F. (288° to 343° C.) and air cooled. The coffee is then flaked to a thickness of 5 to 30 mils. This coffee was used for single serving brewing in a packet such as a tea bag.

U.S. Pat. No. 4,169,164 issued to Hubbard et al. (1979), and U.S. Pat. No. 4,322,447 issued to Hubbard (1982) describe processes for roasting coffee in a fluidized bed roaster having 2-stages. In the '164 patent the coffee is partially roasted at 440° to 470° F. (227° to 243° C.) and then finished roasted at 515° to 545° F. (268° to 285° C.), to a dark brown color. In the '447 patent the beans are roasted at the same temperature in both stages, about 550° to 570° F. (288° to 299° C.). The beans are cooled to form a low density roasted coffee having high soluble yields. The roasting time is 3 to 4 minutes. Both of these coffees are said to have increased extractability or higher yield of brew solids.

With the advent of the automatic drip coffee maker, coffee is often held in both the home and the office on a warming plate for extended periods of time. During this holding time the coffee develops bitter off-flavors and burnt notes. This is partially due to the evaporation of the water and of volatile coffee aroma components during the long heating time, and also to chemical reactions between the brew components which occur during this prolonged heating. The discovery of a roast and ground coffee which would provide a brew which could be held for extended periods of time without a significant change in flavor is highly desirable.

Surprisingly, it has been found that such a product can be prepared. The product is characterized by higher levels of sucrose, a higher ratio of 3-caffeoylquinic acid to caffeine, increased dry headspace aroma, increased extractability of the brew solids, and a lower ratio of quinic acid to 3-caffeoylquinic acid when compared to conventionally processed coffee. The brew obtained from this product is characterized by lower total acid levels, and more low molecular weight compounds in the brew solubles than conventional coffee brews. This unique coffee is prepared by processing a single grade or blend of grades of green coffee beans or green decaffeinated coffee beans under very carefully defined roasting, quenching and grinding conditions which results in less flavor degradation or volatilization.

It is an object therefore of this invention to provide a coffee product which upon brewing is less bitter and has better holding quality or freshness retention than conventionally prepared coffees.

It is a further object of this invention to provide a novel, ultrafast roasting process for the preparation of this coffee.

These and other objects of this invention will become obvious from the description herein.

BRIEF SUMMARY OF THE INVENTION

This invention relates to a roast and ground coffee product which when brewed has improved freshness retention or holding quality. When the coffee brew is held under continuous heating conditions, it retains its fresh flavor better than other coffees. It is characterized by a high level of sucrose, high ratio of 3-caffeoylquinic acid to caffeine, high extractability of brew solids, and low ratio of quinic acid to 3-caffeoylquinic acid. The coffee brew prepared from this product has more low molecular weight components in the coffee brew solubles than conventional coffee brews. The coffee brew of the present invention is characterized by reduced bitterness and improved holding quality due to the presence of a high level of green coffee flavor precursers.

The process for preparing this coffee involves roasting a single grade, or preferably a blend of different grades of green coffee beans in from about 30 to about 120 seconds, at temperatures of from 550° F. (228° C.) to about 750° F. (399° C.), preferably in a fluidized bed roaster. The coffee is roasted to a Hunter "L" color of from about 19 to about 23 in such a way that the surfaces of the roasted coffee beans are not more than 10 Hunter "L" units different in color from the average color throughout the beans. The roasted coffee is quenched with air or inert gas to a temperature less than 300° F. (149° C.) and then cooled with air or inert gas to from about 50° F. (10° C.) to about 100° F. (38° C.). The coffee is subsequently ground such that the overall color of the ground coffee is about 19 to about 23 Hunter "L" units, or preferably flaked to an average thickness of about 0.01 to about 0.02 inches (0.25 to 0.51 mm.) such that the overall color of the flaked coffee is from about 19 to about 25 Hunter "L" units.

DEFINITIONS

The terms "coffee" or "coffee product" as used herein comprise dry roast and ground coffee or dry roast, ground, and flaked coffee.

The terms "coffee brew" or "coffee beverage" as used herein comprise liquid coffee as normally consumed after brewing of dry coffee with water.

The term "3-caffeoylquinic acid" as used herein comprises the predominant isomer of chlorogenic acid. Under the nomenclature of the international Union of Pure and Applied Chemistry (IUPAC) this isomer is designated 5-caffeoylquinic acid.

The terms "holding quality" or "hold quality" as used herein comprise the retention of fresh aroma and flavor during continuous heating by coffee brew prepared from the coffee of the present invention.

Other terms will be defined as used hereinafter.

DETAILED DESCRIPTION OF THE INVENTION

Roast and ground coffee products presently available in the marketplace comprise various blends of different grades of coffee. The differing grades of coffee are classified in the art as low, intermediate and high. The low quality coffee are the Robustas, low grade Naturals such a Haiti XXX, Peru Natural, Salvadors, low grade Brazils, and low grade unwashed Arabicas such as the Ugandas, Indonesians, Ivory Coast, Dominican Republic, Ecuador, Resacas and Guatemalan TMS. They are generally described as having rubbery flavor notes and produce brews with strong distinctive natural flavor characteristics often noted as bitter.

Suitable intermediate quality coffees are the Brazilian coffees such as Santos and Paranas, African Naturals, and Brazils free from the strong Rioy flavor such as good quality Suldeminas. Intermediate qualities are characterized as having bland, neutral flavor and aroma, lacking in aromatic and high notes, and are generally thought to be sweet and non-offensive.

High grown coffees such as the good quality Arabicas and Colombians are characterized in terms of natural flavor and aroma described as having "excellent body", "acid", "fragrant", "aromatic" and occasionally "chocolatey". Examples of typical high quality coffees are "Milds" often referred to as high grade Arabicas, and include among others Colombians, Mexicans, and other washed Milds such as strictly hard bean Costa Rica, Kenyas A and B, and strictly hard bean Guatemalans.

Generally, roast and ground coffees contain a blend of all three classes of coffees. Blending is utilized to emphasize the desirable characteristics of each grade of coffee. Some strong body notes characteristic of the low grade coffees are desirable, as well as some fragrant and aromatic notes characteristic of high grown coffees. Intermediate grade quality coffees typically contribute to the overall taste impact and body of the coffee. The coffee product of the present invention is prepared from a single grade, or preferably from a blend of grades of green coffee beans or green decaffeinated coffee beans.

Processing Conditions

The unique coffee of the present invention is prepared under carefully defined roasting, quenching and grinding conditions. The particular processing parameters result in less flavor degradation or volatilization.

Green coffee beans having an initial moisture content of from about 8% to 14% by weight are metered into a roaster which is capable of forming a fluidized bed of green coffee beans. Suitable roasters for this purpose include the Jetzone ® roaster manufacture by Wolverine (U.S.) and the Probat ® roaster manufactured by Probat-Werke (Germany). Any fluidized bed roaster can be used. Any other roasting equipment which causes a rapid heating of the bean such as that achieved through fluidization can be used.

The green coffee beans are then roasted in from about 30 to 120 seconds, preferably in from about 45 to about 90 seconds and most preferably in from about 60 to about 75 seconds using air or another fluidizing heat exchange medium having a temperature of from about 550° F. (288° C.) to about 750° F. (399° C.) and preferably a temperature of from about 600° F. (316° C.) to about 675° F. (358° C.). In a preferred mode, air, which has been heated by contact with a natural gas or oil fired burner, is directed downward through tubes into a flowing stream of coffee beans onto a surface and reflected back upwards through the beans, thereby fluidizing and roasting the beans. The beans can also be mechanically agitated in addition to the agitation caused by the fluidizing gases.

The green coffee is roasted to an average color of from about 19 to about 23 Hunter "Hunter" units, preferably from about 20 to 22 Hunter "L" units. The individual coffee beans must be roasted uniformly such that a color difference of about 10 Hunter "L" units or less, and preferably no more than about 3 Hunter "L" units, exists between the outer surfaces of the beans and the average color throughout the beans. Additionally, individual coffee beans of comparable grade and size must not vary in color from each other by more than about 10 Hunter "L" units, and preferably by not more than about 3 Hunter "L" units. This roast color criticality is usually measured on the roasted, quenched and cooled coffee beans prior to subsequent processing into a finished coffee product.

The roasted coffee beans must be quickly quenched to keep the color from developing further. The roasted coffee beans are "quenched", i.e. the roasting process is stopped, by lowering the temperature of the beans to below about 300° F. (149° C.) in about 20 seconds. In a preferred mode, filtered air having a temperature of not more than about 100° F. (38° C.) and preferably not more than about 80° F. (27° C.) is directed downward through tubes into a flowing stream of roasted coffee beans, thereby fluidizing and rapidly cooling, i.e. quenching them to below about 270° F. (132° C.) in about 10 seconds or less. The roasted and quenched coffee beans are further cooled to below about 100° F. (38° C.) in not more than an additional 100 seconds and preferably in not more than an additional 50 seconds. It is critical to the production of the unique product described herein that the coffee be quenched using air or an inert gas such as nitrogen, carbon dioxide or helium. Water quenching, as and to the extent practiced in the industry, will not produce the unique product herein. In some instances, it may be desirable to increase the moisture level in the roasted coffee prior to subsequent processing. This may be desirable to control dust, static electricity and particle size distribution in subsequent grinding and conveying operations. If moisture is to be added to the roasted beans, it must be added after the beans are cooled to less than about 200° F. (93° C.) and preferably to less than about 160° F. (71° C.).

During both roasting and cooling the preferred bed depth for the fluidized bed is from about 1 to about 4 inches (2.5 to 10.2 cm.). A suitable feed rate through a roaster would be of the order of from about 5500 to about 10,000 pounds of coffee/hour (2500 to 4525 kg. of coffee/hour).

The level of fluidization during roasting is approximately 9 to 14 pounds (4 to 6 kg.) of hot air per pound (0.454 kg.) of green coffee per minute, while that during quenching is approximately 15 to 20 pounds (7 to 9 kg.) of air per pound 0.454 kg.) of roasted coffee per minute.

The roasted coffee beans are then ground. Any conventional coffee grinder can be used. Depending upon the specific particle size distribution desired in the final product of the present invention, the coffee fractions can be ground to the particle size distributions or "grind sizes" traditionally referred to as "regular", "drip", or "fine" grinds. The standards of these grinds as suggested in the 1948 Simplified Practice Recommendation by the U.S. Department of Commerce (see Coffee Brewing Workshop Manual, page 33, published by the Coffee Brewing Center of the Pan American Bureau) are as follows:

|  | Sieve (Tyler) | Wt. % |
| --- | --- | --- |
| "Regular grind": | on 14-mesh | 33% |
|  | on 28-mesh | 55% |
|  | through 38-mesh | 12% |
| "Drip grind": | on 28-mesh | 73% |
|  | through 28-mesh | 27% |
| "Fine grind": | through 14-mesh | 100% |
|  | on 28-mesh | 70% |
|  | through 28-mesh | 30% |

Typical grinding equipment and methods for grinding roasted coffee beans are described, for example, in Sivetz & Foote, "Coffee Processing Technology", Avi Publishing Company, Westport, Conn., 1963, Vol. 1, pp. 239-250.

The color of the final product, when ground, should be from about 19 to about 25 Hunter "L" units. For decaffeinated coffee the final product color is also from about 19 to about 25 Hunter "L" units.

The cooled roasted coffee beans can also be milled to provide a flaked coffee which has even greater extractability.

In the step of roll milling the roast and ground coffee to produce a flaked coffee, it has been found important to control several processing variables: (1) coffee feed temperature, (2) roll surface temperature, (3) roll diameters, (4) static gap, (5) the roast and ground coffee feed moisture content, (6) feed rate, (7) roll peripheral surface speed, (8) roll pressure, and (9) the mill feed particle size distribution.

The process of the present invention can be practiced with the aid of any of a variety of roll mills of various roll diameters capable of subjecting roast and ground coffee to mechanical compressing action and adapted to the adjustment of roll pressure, roll speed and roll temperature. Suitable mills are those having two parallel rolls such that coffee particles passed between the rolls are crushed or flattened into flakes. Normally, smooth or highly polished rolls will be employed as they permit ready cleaning; other rolls can, however, be employed if the desired flaking effects can be obtained.

The temperature of roast and ground coffee when fed into the mill rolls should be about 35° F. (2° C.) to about 70° F. (21° C.). Maintenance of the coffee feed temperature along with maintenance of the roll surface temperature within the ranges given below insures that aroma losses during the roll milling step are sufficiently reduced such that the resultant flaked coffee has an aroma level sufficient to provide the desired initial aroma level for flakes of all thicknesses.

Control of the surface temperature of each roll has been found to be important to the provision of flaked roast and ground coffee of high extractability. Roll surface temperature, as used herein, is measured in degrees Fahrenheit and refers to the average surface temperature of each roll of the roll mill. The rolls can be operated at differential operating temperatures. However, operation under conditions of differential roll temperatures is not preferred. Best results are obtained when each roll is operated at the same temperature.

The surface temperature of each of the respective rolls can be controlled in a known manner. This is usually accomplished by control of the temperature of a heat exchange fluid passing through the inner core of the rolls. Roll surface temperatures within the range of from about 50° F. (10° C.) to about 80° F. (27° C.), preferably between about 60° F. (16° C.) and about 70° F. (21° C.) are used herein. In general, higher roll surface temperatures produce flakes of roast and ground coffee which typically have undesirably low levels of aroma. Lower roll surface temperatures require elaborate cooling systems and therefore higher costs.

the diameter of the mill rolls controls the angle of entry into the nip which in turn affects flake thickness and bulk density. Best results are obtained from mills having diameters in the range of from about 6 to about 30 inches (15 to 76 cm.). Examples of suitable mills which can be adapted in a known manner to operate within the parameters defined hereinbefore include any of the well-known and commercially available roll mills such as those sold under the tradenames of Lehmann, Thropp, Ross, Farrell and Lauhoff.

As used herein, the term "mechanical static gap" represents that distance separating the two mill rolls along the line of nip while at rest and is typically measured in mils. One mil is equal to 0.001 inch. "Nip" is a term used in the art to define the length of surface contact between two rolls when the rolls are at rest. To illustrate, it can be thought of as a line extending the full length of two cylindrical rolls and defining the point or line of contact between two rolls. A special condition of roll spacing is "zero static gap" which is used herein to indicate that the two rolls are in actual contact with each other along the line of nip when the roll mills are at rest. Because of the deflecting action of the coffee feed as it passes through the roll mill, the static gap setting must be less than the desired flake thickness. Suitable static gap settings range from 0 (i.e., from a zero gap setting) up to about 5 mils, 0.005 inch. Suitable flake thickness is from about 8 to about 25 mils, preferably from about 12 to about 20 mils.

The feed rate into the roll mill is to be distinguished from the throughput rate of the roll mill. The feed rate to the roll mill is that amount of material per hour per inch of nip which is fed into the nip area. The throughput rate is the amount of material per hour per inch of nip that actually passes through the roll mill. When the feed rate exceeds the throughput rate, a condition occurs which is referred to in the art as "choke feeding".

Conversely, when the feed rate falls below the theoretical throughput rate, the feed rate and throughput rate are the same. This condition is referred to in the art as "starve feeding". Starve feeding offers particular process advantages such as increased equipment life and increased process flexibility and is, therefore, the suitable mode of operation in the method of the present invention.

Control of the peripheral surface speeds of the rolls has also been found to be important to the provision of the present flaked coffee. The roll peripheral surface speed is measured in feet per minute of roll surface circumference which passes by the nip. Generally, the roll mill should be operated at a roll speed of from about 470 ft./min. to about 1880 ft./min. (143 to 513 meters/min.), preferably from about 1050 ft./min. to about 1550 ft./min. (320 to 472 meters/min.).

For a given set of roll mill operating conditions, the throughput rate, the roll peripheral surface speed and the thickness of the flaked coffee produced are closely related. In the production of flaked coffee of a specified thickness, the throughput rate is directly related to the roll peripheral surface speed. Thus, an increase in the roll peripheral surface speed allows an increase in the throughput rate in producing flakes of specified thickness. When a constant throughput rate is maintained (e.g., by controlling the feed rate), higher roll peripheral surface speeds produce thinner flakes and conversely, lower roll peripheral surface speeds produce thicker flakes.

As the roll peripheral surface speeds increase to greater than about 1700 ft./min. (518 meters/min.), the production of undesirably high levels of fines beings to occur. Moreover, high peripheral surface speeds promote temperature increases which can alter and degrade the flavor of the roast and ground flakes produced.

While peripheral surface roll speeds have been set forth in connection with operation of a roll mill to provide flaked coffee of improved extractablility, it will be appreciated that optimal speeds will be determined in part by the other roll mill conditions such as the size of the rolls employed, the static gap setting, etc., as well as the physical and organoleptic properties desired in the flaked product.

Roll pressure will also influence the nature of the coffee flakes obtained by the process of the present invention. Roll pressure is measured in pounds per inch of nip.

To produce the present flaked coffee product in high yield, roll pressures should be within the range of from 150 lbs./linear inch of nip to 4,000 lbs./linear inch of nip (27 kg./cm. of nip to 714 kg./cm. of nip), and preferably within the range of from 1,000 lbs./linear inch of nip to 2,000 lbs./linear inch of nip (178 kg./cm. of nip to 357 kg./cm. of nip). In general, operable feed rates are directly related to the roll pressure. Thus, higher roll pressure allows a higher feed rate to the roll mill to produce a flake of specific thickness for otherwise equivalent operating conditions of the roll. Roll pressure can also be used to fine tune finished product density, e.g., lower roll pressure results in slightly lower density. The disadvantages of using higher roll pressures are primarily mechanical, e.g., more expensive equipment is needed to produce higher roll pressures. Conversely, at low pressures, the feed rate can drop below commercially desirable rates.

The particle size distribution of the roll mill feed of roast and ground coffees has an effect on the particle size distribution of the resultant flaked coffee product of the present invention. A coarse mill feed particle size distribution causes the final flaked product to have a coarser particle size distribution than if the mill feed particle size distribution had been finer. Therefore, depending upon the specific particle size distribution desired in the final product, the coffee can be "ground" to meet the specifications. The ranges that are suitable for use and the preferred ranges for mill feed particle size distribution in this invention are:

| Sieve Size (U.S. Standard) | Weight % of the Composition | Preferred Weight % of the Composition |
| --- | --- | --- |
| remains on 12 | 40-80 | 45-55 |
| through 12, remains on 16 | 20-50 | 25-35 |
| through 16, remains on 20 | 0-20 | 5-10 |
| through 20, remains on 30 | 0-10 | 0-5 |
| through 30 | 0-10 | 0-5 |

The Coffee Product

The coffee of the present invention, when brewed, retains its freshness during prolonged heating. This freshness retention or holding quality is a valuable benefit in restaurants, offices, and other situations where coffee is brewed and maintained warm to be ready for serving.

The coffee product herein is characterized in having a higher level of sucrose, a higher ratio of 3-caffeoylquinic acid to caffeine, a greater extractability, more aroma, a lower ratio of quinic acid to 3-caffeoylquinic acid, and a lower density, than the same coffee product which is roasted to the same average color in 3 minutes or longer using either a conventional batch or a continuous roaster.

The undecaffeinated coffee of the present invention has a minimum ratio of 3-caffeoylquinic acid to caffeine of 0.98, and the ratio is typically about 1.1. Conventional coffees have a ratio of about 0.84 to about 0.94. The caffeine content of the undecaffeinated coffee of the present invention is a minimum of 1.05% by weight. If the coffee has been decaffeinated, usually 97% by weight of the caffeine has been removed.

The coffee product of the present invention contains a minimum of 0.5% by weight sucrose, typically about 0.8%, and 0.3% by weight sucrose if decaffeinated, typically about 0.5%. In comparison, conventionally processed coffees have an average sucrose content of about 0.3% or less if undecaffeinated and is not detectable if decaffeinated. Sucrose is naturally present in green coffee beans and the higher level results because of less degradation during processing.

The greater extractability of the coffee of the present invention is demonstrated by a higher level of brew solids in the brewed coffee. The claimed coffee, when brewed, typically has a brew solids from about 5% to about 25% higher than conventional fast-roasted coffees and up to about 45% higher than conventional batch roasted coffees when brewed. In addition, the claimed coffee has a maximum ratio of quinic acid to 3-caffeoylquinic acid of 0.60, and the ratio is typically about 0.54. Conventional coffees have a ratio of about 0.76 or higher. The claimed coffee when decaffeinated likewise has a lower ratio of quinic acid to 3-caffeoylquinic acid than conventional decaffeinated coffees.

The claimed coffee has more aroma on a per gram basis than conventionally processed coffees. The coffee product of the present invention has an aroma as determined by gas chromatography of about 25% to about 40% stronger than that of conventionally processed coffee. The decaffeinated coffee of the present invention has an aroma about 78% stronger than the leading commercially available decaffeinated coffee. The tamped density of the claimed coffee product when flaked ranges from about 0.350 g./cc. to about 0.410 g./cc. The tamped density of the claimed coffee when ground ranges from about 0.340 g./cc. to about 0.355 g./cc.

The coffee brew obtained from the product herein has lower total acidity, and more low molecular weight components in the coffee brew solubles than conventional coffee brews. The titratable acidity per 1% brew solids of the coffee brew of the present invention is a maximum of 4.7. That of conventional coffee brews is about 4.8 to about 5.8. For the decaffeinated coffee of the present invention the titratable acidity is about 3.5, comparable to other decaffeinated coffees. The higher level of lower molecular weight components in the coffee brew solubles of the claimed coffees as demonstrated by FIGS. 1 through 7 is consistent with its higher sucrose levels. Generally, low molecular weight compounds contribute more to flavor and aroma.

The most important attributes of this coffee brew are reduced bitter flavor and better holding quality. Moreover, this coffee beverage, when held on heat for 1 hour is not significantly different in flavor than the same coffee beverage freshly brewed. This improved holding quality or freshness retention has been confirmed by expert taste panelists who found a greater degree of difference between the taste of freshly brewed and 1-hour old conventionally processed coffee than between freshly brewed and 1-hour old coffee of the present invention. The coffee brew of the present invention has a maximum degree of difference of 0.40, typically about 0.35. The degree of difference for conventional coffee brews is about 0.5 or greater.

While not wishing to be bound by theory, it is believed that the higher level of 3-caffeoylquinic acid and of sucrose in the coffee are responsible for the less bitter quality and lower acidity level. By having a coffee which contains more 3-caffeoylquinic acid, it is indicative that the acid has not decomposed to quinic acid and phenols to the extent it has in coffee that has been processed in a conventional manner thereby producing bitter materials in the brew. Furthermore, caffeine, a known bitter substance, is found to be at lower levels in coffee brewed from this product when compared to other products brewed at the same strength. The ratio of 3-caffeoylquinic acid to caffeine is proportional to roast color. This relationship is linear with a correlation coefficient of 0.996. A lighter roast corresponds to a higher 3-caffeoylquinic acid to caffeine ratio. It is believed that use of ultra-fast roasting results in less roasting of the bean interior when compared to a conventionally roasted product of equal average color throughout. Thus, flavor precursors are preserved in those lighter roasted portions of the coffee bean. On prolonged heating of the coffee brew, these lighter roasted flavor precursers develop into mild "roasted" coffee flavor and aroma, thus developing and maintaining the fresh brewed flavor and aroma during heating. Coffee roasted by other methods does not have this freshness retention property. Instead, the coffee brew has roasted flavors and aromas which develop into more burnt and bitter flavors and aroma and tastes "old".

The higher level of low molecular weight materials is indicative of the presence of more sugars such as sucrose in the product. These sugars have not had a chance to polymerize, decompose to acid substances, or participate in reactions with amino acids (browning or Maillard reactions) to the same degree as occurs in conventional roasting methods. Additionally, the higher levels of these sugars may contribute to a milder tasting, less bitter beverage.

The characteristics of the coffee produced by the process herein and of the coffee brew prepared from it are summarized in Table I. All percents are by weight unless otherwise stated. Decaffeinated coffee has similar characteristics except for those involving caffeine or where noted.

TABLE I

| Component | Coffee | Decaffeinated Coffee |
|---|---|---|
| Sucrose, % | Minimum of 0.5 | Minimum of 0.3 |
| Ratio of 3-caffeoylquinic acid to caffeine | Minimum of 0.98 | — |
| Caffeine, % | Minimum of 1.05 | — |
| Ratio of quinic acid to 3-caffeoylquinic acid | Maximum of 0.60 | Maximum of 0.96 |
| Extractability, brew solids, % | Minimum of 0.93 | Minimum of 0.70 |
| Aroma | 25% to 40% stronger than conventional | 78% stronger than conventional |
| Tamped density, g./cc. | 0.340 to 0.410 | 0.340 to 0.410 |

TABLE I-continued

| Component | Coffee Brew | Decaffeinated Coffee Brew |
|---|---|---|
| Titratable acidity, normalized | Maximum of 4.7 | Average of 3.5 |
| Hold quality, degree of difference | Maximum of 0.4 | Maximum of 0.4 |

Testing and Evaluation

I. The following test was performed on the roasted, quenched, and cooled coffee beans prior to grinding or flaking, and also on the final ground or flaked product.

A. Roast Color

The Hunter Color scale values, utilized herein to define a preferred color of a ground or flaked coffee product, are units of color measurement in the Hunter Color system. That system is a well-known means of defining the color of a given material. A complete technical description of the system can be found in an article by R. S. Hunter, "Photoelectric Color Difference Meter", Journal of the Optical Society of America, Vol. 48, pp. 985-95, 1958. Devices specifically designed for the measurement of color on the Hunter scales are described in U.S. Pat. No. 3,003,388 to Hunter et al., issued Oct. 10, 1961. In general, Hunter Color "L" scale values are units of light reflectance measurement, and the higher the value is, the lighter the color is since a lighter colored material reflects more light. In particular, in the Hunter Color system the "L" scale contains 100 equal units of division; absolute black is at the bottom of the scale (L=O) and absolute white is at the top of the scale (L=100). Thus in measuring Hunter Color Values of the coffee of this invention, the lower the "L" scale value the darker the coffee. The "L" scale values described herein are also accurate means of defining the degree of roast necessary to produce a coffee which when ground or flaked gives a product within the "L" scale values herein described. Determination of optimum roasting conditions varies with the coffee employed but is within the skill of one knowledgeable in the field and can be determined after a few Hunter Color measurements of degrees of roast and comparison of the roasted and ground color values with the roasted, ground, and flaked color values.

II. The following tests were performed on the ground or flaked coffee processed in accordance with this invention prior to brewing to prepare a coffee beverage.

A. Sucrose

Sucrose was determined using the method described in Brobst, Cereal Chem., 43, p. 35-43, 1966, as modified according to "Methods of Silylation", p. 182-184, Pierce Handbook and General Catalog, Pierce Chem. Co., Rockford, Ill. (1978), with a detection limit of 0.2%.

B. Caffeine and 3-Caffeoylquinic Acid

The levels of caffeine and 3-caffeoylquinic acid in the coffee of the present invention were measured using liquid chromatography.

Chromatography is a physical means of separating a mixture into its individual components which indicates the concentration of each. A sample is injected into a solvent carrier which enters a chromatographic column of small diameter packed with a uniform sized solid. Separation of the components of the sample results from a difference in the multiple forces by which the column materials tend to retain each of the components. The nature of the retention can be by adsorption, solubility, chemical bonding, polarity, or molecular filtration. Consequently, the components move through the column and emerge in the inverse order of their retention. Upon emerging from the column at the outlet port, the components enter a detector. The detector generates an electrical signal proportional to the concentration of each component which is integrated and charted, appearing as a peak or curve with an indication of the integration. Comparison of retention times of the peaks from the samples with known reference can be used to identify sample components. The concentration of the component is determined by the integrated area under each peak or curve or the height of each peak or curve.

A Beckman liquid chromatograph (Model 110), Beckman variable wavelength detector (Model 155), and a Spectra-Physics recording integrator (Model 4100) were used. A mobile phase of 83.5% v/v (volume by volume) of 0.05 molar potassium dihydrogen phosphate in distilled-deionized water, 15% v/v methanol, 1% v/v acetonitrile, and 0.5% w/v (weight by volume) tetramethyl ammonium chloride, was employed with a Waters micro-Bondapak C18 reverse phase column, 3.9 mm. by 30 cm. It will be appreciated by those skilled in the art that C18 reverse phase columns from other manufactures may be used and that the mobile phase composition may have to be adjusted slightly to maintain the required separation. Detection was at 290 nm. and 0.1 absorption units full scale.

Three grams of coffee were extracted with 50 ml. boiling distilled deionized water for five minutes. The extract was filtered through Whatman No. 4 paper, cooled to room temperature and diluted to 100 ml. with distilled deionized water. The diluted coffee extract was filtered through a 0.45 micron disposable filter and diluted 1:10 with the mobile phase previously described. A sample of 50 microliters was injected onto the reverse phase column with a mobile phase flow rate of 2.0 ml./min. Quantitation, on a weight percent basis, was accomplished by comparing peak heights to a calibration curve prepared from standard materials. A ratio of the concentration of 3-caffeoylquinic acid to caffeine was calculated.

C. bulk/Tamped Density

Density was determined using the following method: One hundred grams of dry coffee was placed into a 500 ml. glass graduated cylinder. The cylinder was then vibrated for one minute using an FMC vibrator at setting Number 6. The density of the product was calculated by dividing the sample weight in grams by the sample volume in cubic centimeters.

D. Extractability

The enhanced extractability of the coffee of the present invention compared with prior art coffees as a reference is demonstrated by the following procedure: A drip coffee extraction is performed by charging 57.0 grams of coffee and 1860 ml. of 195° F. (91° C.) water to a Bunn OL-20 12-cup coffee maker and allowing the coffee to be drip brewed. The brew is cooled to room temperature and analyzed for solids content by index of refraction.

Brew solids were measured by refractive index using a Zeiss Model 71498 refractometer equipped with an L1 prism, wherein the sample temperature during measurement was maintained at 29° C. The readings were correlated with readings of reference solutions of known brew solids content.

E. Dry Headspace Aroma

A suitable technique for measuring the coffee aroma of the coffee produced by the process of the invention is gas chromatography. The flame ionization gas chromatograph analytical measurement used herein measured the total content of organic compounds in a gas headspace or voidspace sample from package coffee on a scale of relative intensity. The scale was graduated in microvolt-second (referred to herein as "counts") which was a measure of the area under the intensity curve, and the result was reported as an integration of the total area under the curve in total microvolt-seconds ("total counts").

The chromatograph comprises two 6 feet (1.8 m.) empty stainless steel columns of 1/8-inch (0.3 cm.) diameter with type S restrictors housed in an oven section for isothermal temperature control. The column was not packed because the gas was not to be separated into individual compounds as commonly done in this type of analysis. A hydrogen flame detector was used at the outlet port. An electrometer received the output signal from the flame detector and amplified it into a working input signal for an integrator. The integrator both sent a display signal to a recorder to print out the response curve and electronically integrated the area under the curve.

The gas sample was injected into a heated injection port, and was immediately swept into the column by a carrier gas flow. The detector ionized the sample and generated an electrical signal proportional to the concentration of the materials in the carrier gas. The ionized gases and carrier gas was then vented from the unit.

A Carle gas chromatograph (Model 9701), and Hewlett Packard integrator (Model 3390A) were used. Nitrogen pressure in the column was approximately 20 psig (1.4 kg./sq. cm.). Air pressure of 15 psig (1.0 kg./sq. cm.) was used to flush out the detector. An oven temperature of 110° C. was used and maintained to keep the volatiles vaporized. The hydrogen was supplied from a gas cylinder regulated at 20–25 lbs. psig (1.4–1.8 kg./sq. cm.).

Each peak was measured in counts, the counts being first measured by the flame detector and then both integrated and recorded. The number of counts for a particular component was directly proportional to the number of milligrams of that component in the vapor sample. The counts for all peaks generated by a sample were added to obtain a total peak area. This wad divided by the sample size to calculate aroma per gram of coffee.

The gas chromatograph detector response was precisely calibrated as follows: A standard gas mixture of 0.50% methane in nitrogen by weight was used to set the flame ionization response. Prior to analyzing the samples, a 0.25 ml. sample of gas was obtained from a gas cylinder. The gas sample was at a pressure of 4.0 psi (.3 kg./sq. cm.). The gas sample was syringed into the inlet port of gas chromatograph while adjusting the hydrogen flow, until an area reading of 65,000±1000 was obtained. This procedure was repeated unit the desired area reading was obtained.

The sample must be vacuum packed for at least 3 days at 75°±5° F. (24° C.±3+ C.) before sampling. The container was placed in an air-tight box supplied with a source of inert gas such as $N_2$. The vacuum-sealed canister of coffee was punctured to remove the vacuum, then re-sealed and allowed to equilibrate at least four hours at 75°±5° F. (24° C.±3° C.) to allow aroma phase equilibration.

After equilibration, a 0.25 ml. sample of the aromatic atmosphere of the canister headspace/voidspace was taken again using the same type of syringe as used for the standard methane sample. The gas sample was then injected into the inlet port of the gas chromatograph. The counts were displayed on the chromatogram. The total peak area was divided by the sample size to calculate aroma per gram of coffee.

F. Ratio of Quinic Acid to 3-Caffeoylquinic Acid

The levels of quinic acid and 3-caffeoylquinic acid in the coffee of the present invention were measured by gas chromatography.

A Hewlett Packard gas chromatograph (Model 5880) with flame ionization detector was used with a 25 m. by 0.20 mm. internal diameter fused silica capillary column coated with a liquid phase of CP-Sil-5 CB (Chrompack, Inc.). Separation of the components of the sample resulted for differences in the multiple forces by which the liquid phase coated on the inner walls of the capillary column tended to retain each of the components. The components moved through the column and emerged in the inverse order of their retention. Upon emerging from the column the separated components entered the flame ionization detector where an electrical signal is generated, recorded and integrated by a Hewlett Packard Model 1000-3357 laboratory automation system. Comparison of retention times of coffee samples with known reference materials were used to identify components. The concentration of the component was related to the integrated area under each peak or curve in units of millivolt-seconds or counts.

Samples of coffees were prepared by extracting 2.5 g. with 25 ml. of dimethylsulfoxide for 60 minutes while heating at 90° C. in a water bath. The extract was filtered through a 0.5 micrometer filter. One milliliter of filtrate was mixed with 1.0 ml. of Tri-Sil concentrate (Pierce Chemical Co. ) which contained 1.0 mg. n-pentacosane as an interanl standard. This reaction was carried out for 30 minutes at 50° C., and resulted in formation of the trimethylsilyl ethers of the quinic and 3-caffeoylquinic acids. The ethers of the acids were more readily analyzed by gas chromatography than the underivatized acids.

One microliter of the derivatized sampled extract was injected into the chromatograph. Only 1 part in 90 of this actually entered the chromatographic column. The areas of the peaks from quinic acid and 3-caffeoylquinic acid were measured by the Hewlett Packard lab automation system. Quantitation, on a weight percent basis, was accomplished by comparing peak areas to a calibration curve prepared from standard materials. A ratio of the concentration of 3-caffeoylquinic acid to caffeine was calculated.

III. The following tests were performed on the coffee of the present invention after brewing. For each brewing 47 grams of the coffee of Example 1 was added to the basket of a Bunn Model OL 20 coffee maker containing a paper filter. The basket was placed into position in the coffee maker and 1860 ml. of water added to the coffee maker. The water was heated to 190° F. to 200° F. (88° C. to 93° C.) and flowed through the coffee. The volume of coffee brew generated was from about 1720 ml. to about 1760 ml. in each brewing.

A Titratable Acidity

Titratable acidity was measured as the milliliters of 0.1 normal sodium hydroxide required to titrate a ample of 100 grams of coffee brew to a pH of 7. After brewing, the coffee brew was cooled and 100 grams weighed into a beaker. An initial pH reading was noted and the sodium hydroxide added slowly from a burette with stirring of the sample to a pH of 7. A Corning Model 130 pH meter was employed with a Corning Model 139-394 (476051) electrode. The sodium hydroxide measurement was normalized to account for variations in brew solids present by dividing the milliliters of sodium hydroxide by the percent by weight brew solids in the sample. This normalized value represented the measure of total acid per 1% of soluble coffee solids.

B. Molecular Weight of Brew Solubles

The brew of the coffee of the present invention has been found to have more low molecular weight solubles than conventionally processed coffees using liquid chromatography. This increase of lower molecular weight components is consistent with the higher sucrose levels of the presently claimed coffee. Also, low molecular weight compounds generally contribute more to flavor and aroma.

Sample of the brews, both fresh and held, were analyzed. This freshly brewed coffees, 450 ml. of each, were placed in a carafe and held on a Bunn Model WX-2 warmer for 1 hour. After rediluting to 450 ml. to compensate for evaporation loss, samples of the brews were analyzed for their molecular weight distribution in the same manner as the fresh brews.

A Varian liquid chromatograph (Model 5000), Waters differential refractometer (Model R401), and Pederson recorder (Model 370 MR) were used with two duPont Zorbax PSM60 size exclusion columns each 25 cm. by 6.2 mm. inner diameter connected in series. Commercially available gel-based columns covering a molecular weight ranging approximately 100 to 50,000, such as Toyo Soda TSK-PW (Toyo Soda Mfg. Co. Ltd., Tokyo, Japan), may be substituted to achieve these separations. The mobile phase was Milli-Q water (water purified in a Milli-Q Purification Unit available from Millipore Corp. of Bedford, MA) at a flow rate of 1.0 ml./min. The retention time of the peaks indicates the relative molecular weight of the soluble components in the coffee brews, longer retention times correspond to lower molecular weights. Coffee brews were prepared at approximately equivalent brew solids from conventionally processed coffees and the coffee of the present invention as previously described using distilled water. Samples of each were filtered through a 0.45 micrometer filter. Samples of 25 microliters each were injected into the chromatograph. Peak height is related to the quantity of the molecular weight species. A specific peak does not neccessarily represent the level of a single component, but instead represents the cumulative level of all components having molecular weights of that retention time. The coffee samples were compared on the basis of the heights of the various peaks.

C. Expert Taste Panel

The ultrafast roasted coffee was brewed in a Bunn OL-20 2-cup coffee maker, as previously described. A portion of the brew (about 450 ml.) was placed in a Bunn glass carafe and placed on the burner of a preheated Bunn (OL-20 or WX-2) warming plate maintained at about 450° F.±25° F. (232° C.±14° C.) surface temperature, and held on heat for approximately 1 hour.

The "held" coffee beverage was removed from the warmer and cooled in the carafe using a water bath, to about 163° F. (73° C.). A "fresh" brew of the same coffee beverage was prepared and cooled to 163° F. (73° C.). The two beverages were tasted by a panel of 15 experts, using the duo-trio panel technique. In this panel method the panelists were given 3 cups—one standard cup and two unidentified test samples. One of the two test samples was the same as the standard cup. Panelists were requested to determine which of the two test cups was not the standard cup, i.e. the odd cup. After the panelist has made this determination, a degree of difference indicating the magnitude of difference between the standard and odd cup was indicated using the following scale:

0.2 The flavor of the test sample was not distinguishable from the flavor of the standard.

0.3 The flavor of the test sample was very close to the flavor of the standard, and it was difficult to distinguish from the standard.

0.5 The flavor of the test sample was slightly different from the flavor of the standard.

0.8 The flavor of the test sample was moderately different from the flavor of the standard, and would have been picked as being different from the standard even if flavored by itself.

1.2 this test sample was very different in flavor from the standard.

The degree of difference (hereinafter DOD) for the panel was obtained by taking a sum of the DOD's assigned by the panelists. Panelists who incorrectly identified the "odd" cup were automatically assigned of DOD of 0.2 in calculating the overall DOD for the panel. The sum was then divided by the number of panelists participating. The result was the DOD of the panel. A lower degree of difference determined by the panel correlates with increased similarity of the products tested.

Conventionally roasted coffee and the ultrafast roasted product described herein were tested using this expert taste panel procedure. The degree of difference obtained for the ultrafast roasted coffee panel ("fresh" versus "held" beverage) was lower than that of the conventionally roasted coffee. This indicates that the ultrafast roasted coffee tasted closer to fresh after being held than did the conventionally roasted coffee, and therefore had a better holding quality.

The following examples are specific embodiments of the present invention but are not intended to limit it. All percentages are by weight unless otherwise stated.

EXAMPLE I

Example I illustrates the ultrafast roast method of the present invention.

One thousand lbs. (454 kg.) of high-grade green coffee beans, 600 lbs. (272 kg.) of intermediate grade green coffee beans, and 400 lbs. (181 kg.) of low-grade green coffee beans were thoroughly mixed together to form a high quality blend of green coffee beans. This green coffee bland was roasted in a 1 ft. (0.3 meter) wide by 18 ft. (5.5 meters) long Jetzone ® particle oven. The green coffee bland was fed into the roaster using a volumetric screw feeder at a rate of 1,500 lbs./hr. (680 kg./hr.) The temperature of the air used to fluidize and roast the green coffee beans was maintained at 615° F. (324° C.). The pressure of the hot air in the plenum above the fluidizing tubes was maintained at 5 inches (13 cm.) of water (gauge pressure). The vibrating solid pan conveyor which transported the coffee beans through the roasting zone was operated at 170 rpm. A adjustable height barrier at the exit end of this conveyor was set to attain an average bean residence time inside the roasting zone at 60 seconds. An unfluidized bed depth of ¾ inch (2 cm.) was observed where the green coffee entered the roasting zone. The roasted coffee blend exiting the roast zone was fed by gravity immediately into a Jetzone ® air cooler having a vibrating solid pan conveyor 1.5 ft. (0.5 meter) wide and 5 ft. (1.5 meters) long. Filtered ambient air at a temperature of 74° F. (23° C.) was delivered to a plenum above the fluidizing tubes at a pressure of 2.5 in. (6 cm.) of water (gauge pressure). The vibrating solid pan conveyor which conveyed the coffee beans through the cooling zone was operated at 160 rpm. an adjustable height barrier at the exit end of this conveyor was set to attain an average bean residence time inside the cooling zone of 60 seconds. Roasted beans exiting the cooling zone were observed to be at 85° F. (29° C.). Water was atomized onto these 85° F. (29° C.) roasted coffee beans at a rate sufficient to raise their average moisture level from their inherent level of about 3.5% to about 4.0%.

Physical analysis of this roasted coffee blend showed a whole bean bulk density of 0.350 g./cc., a moisture content of 4.0%, an average color of the surface of the beans of 20 Hunter "L" unit and an average color of a finely ground sample of the beans of 22 Hunter "L" units. Visual inspection revealed no apparent scorching of the coffee bean tips and good bean to color uniformity.

The above-roasted blend of coffees was ground in a Gump pilot grinder. A sample of the ground coffee was taken for analysis. A sieve screen analysis indicated that 50% by weight remained on a No. 12 U.S. Standard sieve, 30% by weight passed through a No. 12 U.S. Standard sieve and remained on a No. 16 U.S. Standard sieve, 10% by weight passed through a No. 16 U.S. Standard sieve and remained on a No. 20 U.S. standard sieve, 5% by weight passed through a No. 20 U.S. Standard sieve and remained on a No. 30 U.S. Standard sieve, and 5% by weight passed through a No. 30 U.S. Standard sieve.

The above coarse ground roast coffee was starve-fed by feeding a cascade of the particles into the rolls of a Ross two-roll mill set at zero gap, each roll being of about 18 in. (46 cm.) diameter. The feed rate was about 300 lbs./hr./in. (54 kg./hr./cm.) of nip, while the roll pressure was adjusted to provide a pressure of 350 lb./in. (62 kg./cm.) of nip. Each roll was operated at a peripheral surface speed of about 1400 ft./min. (427 m./min.) and at an average roll surface temperature of about 75° F. (24° C.) The flaked coffee particles dropping from between the rolls were mechanically conveyed into a hopper.

A sample of the flaked coffee was taken for analysis. A sieve screen analysis showed that 5% by weight remained on a No. 12 U.S. Standard sieve, 15% by weight passed through a No. 12 U.S. Standard sieve and remained on a No. 16 U.S. Standard sieve, 15% by weight passed through a No. 16 U.S. Standard sieve and remained on a No. 20 U.S. Standard sleeve, 20% by weight passed through a No. 20 U.S. Standard sieve and remained on a No. 30 U.S. Standard sieve, and 45% by weight passed through a No. 30 U.S. Standard sieve.

The flaked coffee product was characterized by an average flake thickness of 0.015 inch (0.04 cm.) in the following manner: 100 grams of flaked coffee product were poured onto a circular No. 12 U.S. Standard sieve and were agitated by a Ro-Tap sieve shaker (manufactured by U.S. Tyler Co., Mentor, Ohio) for three minutes. The flaked coffee which passed through the No. 12 sieve was thereafter similarly screened using a No. 16 U.S. Standard sieve. From the portion remaining on the No. 16 sieve, ten representative flakes were selected for flake thickness measurement. Each of the ten representative flakes was measured for thickness using a Starrett Model 1010-E gauge manufactured by L. S. Starrett Co. The ten flake thickness measurements were averaged to give the average flake thickness. Analysis of the coffee is detailed in Example V.

EXAMPLE II

Example II illustrates the preparation of a decaffeinated flaked coffee using the ultrafast roast method of the present invention.

One thousand pounds (454 Kg.) of the high quality blend of green coffee of Example 1 were decaffeinated. Nine hundred fifty pounds of this decaffeinated green coffee were roasted in the Jetzoone ® particle oven of Example 1. The green coffee blend was fed into the roaster using the volumetric screw feeder of Example 1 at a rate of 900 lbs./hr. (409 (Kg./hr.). The temperature of the air used to fluidize and roast the decaffeinated green coffee beans was maintained at 617° F. (325° C.). The pressure of the hot air in the plenum above the fluidizing tubes was maintained at 3.1 inches (7.9 cm.) of water (gauge pressure). The vibrating solid pan conveyor which transported the coffee beans through the roasting zone was operated at 267 rpm. The adjustable height barrier at the exit of the conveyor was set to attain an average bean residence time inside the roasting zone of 58 seconds. An unfluidized bed depth of 0.25 inch (0.66 cm.) was observed where the green coffee entered the roasting zone. The roasted coffee beans exiting the roasting zone were fed by gravity immediately into the Jetzone ® air cooler of Example 1. Filtered ambient air at a temperature of 45° F. (7° C.) was delivered to a plenum above the fluidizing tubes at a pressure of 2.5 inches (6.4 cm.) of water (gauge pressure). The vibrating solid pan conveyor which transported the coffee beans through the cooling zone was operated at 185 rpm. The adjustable height barrier at the exit end of the conveyor was set to attain an average bean residence time inside the cooling zone of about 60 seconds. Roasted beans exiting the cooling zone were observed to be at about 116° F. (47° C.).

Physical analysis of the roasted decaffeinated coffee blend showed a bulk density of about 0.35 g./cc., a moisture content of 3.4%, and an average color of a finely ground sample of beans of 20 Hunter "L" units. Visual inspection revealed no apparent scorching of the coffee bean tips and good bean-to-bean color uniformity.

The above roasted blend of decaffeinated coffee was ground in the Gump pilot plant grinder of Example I. A sample of the ground coffee was taken for analysis. A sieve screen analysis indicated that 24% by weight remained on a No. 12 U.S. Standard sieve, 37% by weight passed through a No. 12 U.S. Standard sieve and remained on a No. 16 U.S. Standard sieve, 27% by weight passed through a No. 16 U.S. Standard sieve and remained on a No. 20 U.S. Standard sieve, 8% by weight passed through a No. 20 U.S. Standard sieve and remained on a No. 30 U.S. Standard sieve, and 4% by weight passed through a No. 30 U.S. Standard sieve. The above coarse ground roasted decaffeinated coffee was starve-fed by feeding a cascade of the particles into the rolls of the Ross two-roll mill of Example 1 set at zero gap, each roll being of about 18 inches (46 cm.) diameter. The feed rate was about 320 lbs./hr./inch (57 kg./hr./cm.) of nip, while the roll pressure was adjusted to provide a pressure of 850 lbs./inch (150 Kg./cm.) of nip. Each roll was operated at a peripheral surface speed of about 1400 ft./min. (427 m./min.) and at an average roll surface temperature of about 75° F. (s24° C.). The flaked coffee particles dropping from between the rolls were mechanically conveyed into a hopper.

A sample of the flaked decaffeinated coffee was taken for physical analysis. A sieve screen analysis indicated that 2% by weight remained on a No. 12 U.S. Standard sieve, 14% by weight passed through a No. 12 U.S. Standard sieve and remained on a No. 16 U.S. Standard sieve, 21% by weight passed through a No. 16 U.S. Standard sieve and remained on a No. 20 U.S. Standard sieve, 19% by weight passed through a No. 20 U.S. Standard sieve and remained on a No. 30 U.S. Standard sieve, and 44% passed through a No. 30 U.S. Standard sieve. The flaked coffee product was characterized by an average flake thickness of 0.016 inch (0.04 cm.) in the same manner as for Example I. Analysis of the coffee is detailed in Example V.

EXAMPLE III

Example III illustrates the preparation of a flaked coffee using a known fast-roasting process.

Eight hundred fifty pounds (386 Kg.) of the high quality blend of green coffee beans of Example I were roasted in the Jetzone® particle oven of Example I. The green coffee blend was fed into the roaster using the volumetric screw feeder of Example I at a rate of 715 lbs./hr. (325 Kg./hr.). The temperature of the air used to fluidize and roast the green coffee beans was maintained at 490° F. to 500° F. (254° C. to 260° C.). The pressure of the hot air in the plenum above the fluidizing tubes was maintained at 3 inches (7.6 cm.) of water (gauge pressure). the vibrating solid pan conveyor which transported the coffee beans through the roasting zone was operated at 168 rpm. The adjustable height barrier at the exit end of the conveyor was set to attain an average bean residence time inside the roasting zone of 194 second. An unfluidized bed depth of ⅝ inch (1.6 cm.) was observed where the green coffee entered the roasting zone. The roasted coffee blend exiting the roast zone was fed by gravity immediately into the Jetzone® air cooler of Example I. Filtered ambient air at a temperature of 49° F. (9° C.) was delivered to a plenum above the fluidizing tubes at a pressure of 2.5 in. (6 cm.) of water (gauge pressure). The vibrating solid pan conveyor which conveyed the coffee beans through the cooling zone was operated at 143 rpm. The adjustable height barrier at the exit end of the conveyor was set to attain an average bean residence time inside the cooling zone of about 60 seconds. Roasted beans exiting the cooling zone were observed to be at about 84° F. (29° C.).

Physical analysis of this roasted coffee blend showed a bulk density of about 0.364 g./cc., a moisture content of 2.7%, and an average color of a finely ground sample of beans of 21 Hunter "L" units. Visual inspection revealed no apparent scorching of the coffee bean tips and good bean-to-bean color uniformity.

The above-roasted blend of coffees was ground in the Gump pilot grinder of Example I. A sample of the ground coffee was taken for analysis. A sieve screen analysis indicated 18% weight remained on a No. 12 U.S. Standard sieve, 34% by weight passed through a No. 12 U.S. Standard sieve and remained on a No. 16 U.S. Standard sieve, 28% by weight passed through a No. 16 U.S. Standard sieve and remained on a No. 20 U.S. Standard sieve, 10% passed through a No. 20 U.S. Standard sieve and remained on a No., 30 U.S. Standard sieve, and 10% by weight passed through a No. 30 U.S. Standard sieve. The above coarse ground roast coffee was starve-fed by feeding a cascade of the particles into the rolls of the Ross two-roll mill of Example I set at zero gap, each roll being of about 18 in, (46 cm.) diameter. The feed rate was about 280 lbs./hr./in. (50 kg./hr./cm.) of nip, while the roll pressure was adjusted to provide a pressure of 680 lb./in. (122 kg./cm.) of nip. Each roll was operated at a peripheral surface speed of about 1400 ft./min. (427 m./min.) and at an average roll surface temperature of about 75° F. (24° C.). The flaked coffee particles dropping from between the rolls were mechanically conveyed into a hopper.

A sample of the flaked coffee was taken for analysis. A sieve screen analysis indicated 1% by weight remained on a No. 12 U.S. Standard sieve, 10% by weight passed through a No. 12 U.S. Standard sieve and remained on a No. 16 U.S. Standard sieve, 19% by weight passed through a No. 16 U.S. Standard sieve and remained on a no. 20 U.S. Standard sieve, 18% weight passed through a No. 20 U.S. Standard sieve and remained on a No. 30 U.S. Standard sieve, and 52% by weight passed through a No. 30 U.S. Standard sieve. The flasked coffee product was characterized by an average flake thickness of 0.016 inch (0.04 cm.) in the same manner as for Example I. Analysis of the coffee is detailed in Example V.

EXAMPLE IV

Example IV illustrates the preparation of a flaked coffee using a conventional batch roasting process.

Six hundred pounds(272 kg.) of the high quality blend of green coffee of Example I were roasted in a Jabex-Burns Co. Thermalo bathe roaster to an average color of 22 Hunter "L" units in about 14 minutes total roast time. The roasted beans were quenched with about 10 gallon (38 liters) of water and cooled to about 85° F. (29° C.) in a stirred forced air cooler.

Physical analysis of this roasted coffee blend showed a whole bean bulk density of 0.410 g./cc., a moisture content of 4.0%, an average color of the surface of the beans at about 22 Hunter "L" units and an average color of a finely ground sampled of the beans of 22.3 Hunter "L" units. Visual inspection revealed no apparent according of the coffee beans tips and good bean-to-bean color uniformity.

The above roasted blend of coffee was ground and milled in the same manner as that described in Example I. The flaked coffee particles dropping from between the mill rolls were mechanically conveyed into a hopper. A sample of the flake coffee was taken for analysis. A sieve screen analysis indicated that 10% by weight remains on a No. 12 U.S. Standard sieve, 18% by weight passed through a No. 12 U.S. Standard sieve and remained on a No. 16 U.S. Standard sieve, 20% by weight passed through a No. 16 U.S. Standard sieve and remained on a No. 20 U.S. Standard sieve, 20% by weight passed through a No. 20 U.S. Standard sieve and remained on a No. 30 U.S. Standard sieve, and 32% by weight passed through a No. 30 U.S. Standard sieve.

The flaked product is characterized by an average flake thickness of 0.015 inch (0.04 cm.) using the same measurement technique as that described in Example I. Analysis of the coffee is detailed in Example V.

EXAMPLE V

Example V illustrates the properties of the coffee of the present invention compared to conventionally processed coffee.

The coffees of Example I, II, III and IV, a commercially available coffee believed to have been conventionally processed in a manner similar to Example III, and a commercially available decaffeinated coffee, were analyzed for sucrose, ratio of 3-caffeoylquinic acid to caffeine, caffeine content, ratio of quinic acid to 3-caffeoylquinic acid, tamped density, extractability, and aroma using the methods previously described. A coffee brew was prepared by brewing 47 grams of coffee with 1860 ml. of water in a Bunn Model OL 20 coffee maker containing a paper filter. The water was heated to 190° F. to 200° F. (88° C. to 93° C.) and flowed through the coffee. The volume of coffee brew generated was about 1740 ml. The coffee brew was analyzed for titratable acidity, and molecular weight component distribution using the methods previously described. The resulting data are summarized in Tables II and III and FIG. 1 through 7.

Figure 1:
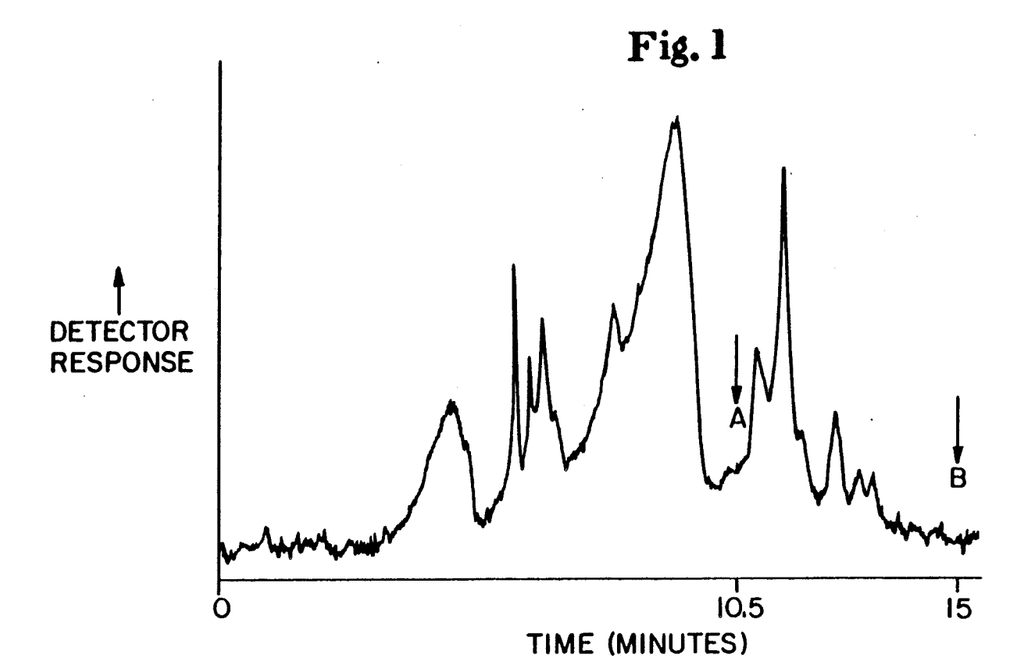
FIG. 1 depicts a liquid chromatogram of the coffee of the present invention when freshly brewed.

FIG. 1 illustrates a liquid size-exclusion chromatogram for the coffee of the present invention for sizing of molecular components. The species exit the columns in order from highest to lowest molecular weights. Thus the species with the highest molecular weights exit the columns first and appear at the left side of FIG. 1. Species with the lower molecular weights exit the columns last and appear on the right side of FIG. 1. The high molecular weight portion of the chromatograms for the coffee of the present invention and for conventionally processed coffees are similar in appearance. FIG. 2 through 7 therefore represent that portion between points A and B of the chromatograms wherein low molecular weight components such as sugar are represented.

Figure 2:
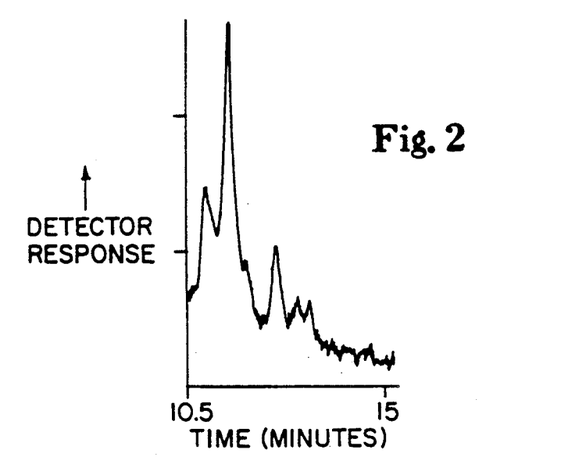
FIG. 2 depicts the chromatogram of FIG. 1 between points A and B.
Figure 3:
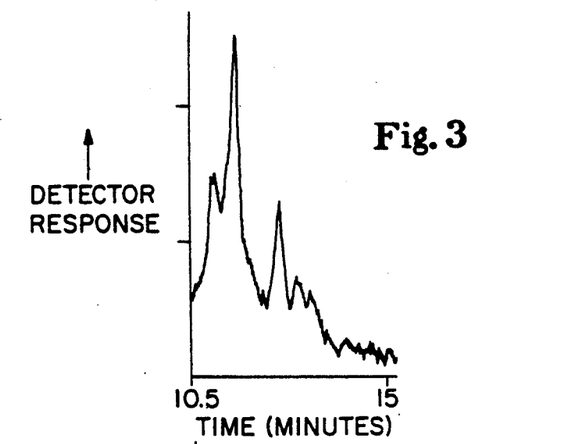
FIG. 3 depicts a liquid chromatogram of the decaffeinated coffee of the present invention when freshly brewed for the interval between points A and B as shown on FIG. 1.
Figure 4:
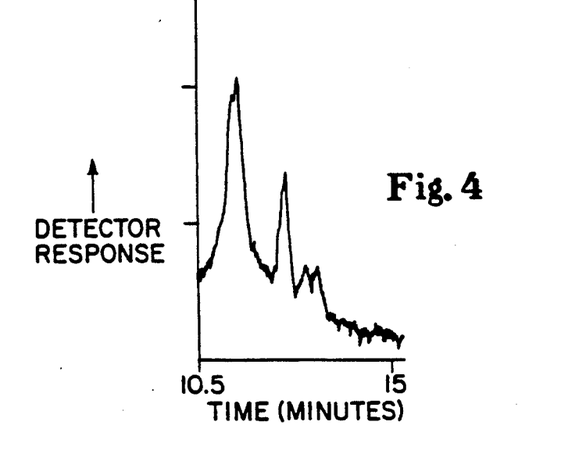
FIG. 4 depicts a liquid chromatogram of conventionally processed coffee when freshly brewed for the interval between points A and B as shown on FIG. 1.

FIG. 2 represents the low molecular weight portion of the chromatogram of FIG. 1 for the coffee of the present invention of Example 1 when freshly brewed. FIG. 3 represents the low molecular weight portion of a chromatogram for the decaffeinated coffee of the present invention of Example II when freshly brewed. FIG. 4 represents this portion of a chromatogram for the conventionally processed coffee of Example IV when freshly brewed. Comparison of FIG. 2 and 3 with 4 demonstrates that the coffee brew of the present invention has a higher level of low molecular weight components. The change in peak heights does not necessarily represent an increase in the level of a single component, but instead represent a change in the level of all components having molecular weights within that range.

Figure 5:
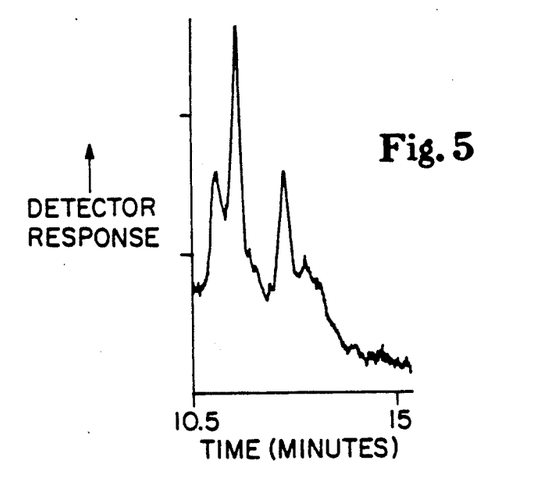
FIG. 5 depicts a liquid chromatogram of the coffee of the present invention after the brew has been heated for one hour for the interval between points A and B as shown on FIG. 1.
Figure 6:
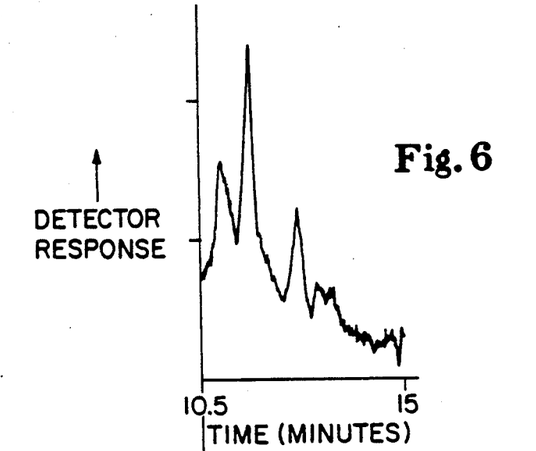
FIG. 6 depicts a liquid chromatogram of the decaffeinated coffee of the present invention after the brew has been heated for one hour for the interval between points A and B as shown on FIG. 1.
Figure 7:
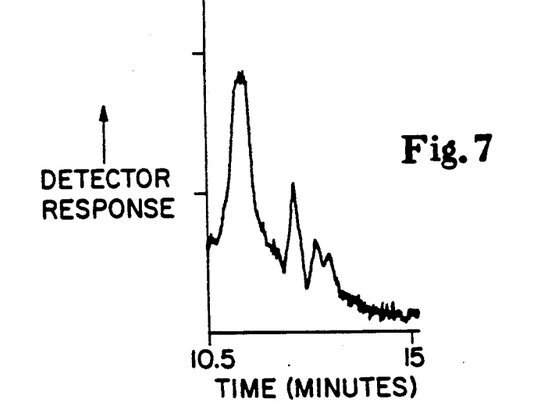
FIG. 7 depicts a liquid chromatogram of conventionally processed coffee after the brew has been heated for one hour for the interval between points A and B as shown on FIG. 1.

FIG. 5, 6 and 7 represent the low molecular weight portion of chromatograms for the coffees of Example I, II and IV, respectively, after the brew has been held heated for one hour. Comparison of FIG. 5 and 6 with 7 demonstrates that the coffee brew of the present invention retains this higher level of low molecular weight components after heating for one hour. The change in peak heights does not necessarily represent an increase in the level of a single component, but instead represents a change in the level of all components having molecular weights within that range.

TABLE II

| Component | Example I Coffee (Ultra-fast roast) | Example III Coffee (Conventional fast roast) | Example IV Coffee (Conventional batch roast) | Commercial Coffee |
| --- | --- | --- | --- | --- |
| Coffee | | | | |
| Sucrose, % | 0.8 | 0.3 | 0.3 | 0.3 |
| Ratio of 3-caffeoylquinic acid to caffeine | 1.15 | 0.94 | 0.91 | 0.84 |
| Caffeine, % | 1.3 | 1.4 | 1.4 | 1.4 |
| Ratio of quinic acid to 3-caffeoyl quinic acid | 0.54 | 0.64 | 0.76 | 0.78 |
| Extractability (brew solids, %) | 0.96 | 0.91 | 0.80 | 0.77 |
| Aroma, counts/g. | 61 | 54 | 43 | — |
| Aroma as a percentage of Example IV | 142% | 126% | 100% | — |
| Tamped density, g./cc. | 0.400 | 0.409 | 0.430 | 0.361 |
| Coffee Brew | | | | |
| Titratable acidity | 4.7 | 4.7 | 4.9 | 4.9 |

TABLE III

| Component | Example II, Decaffeinated Coffee (Ultra-fast roast) | Commercial Decaffeinated Coffee |
| --- | --- | --- |
| Coffee | | |
| Caffeine (%) | 0.07 | 0.04 |
| Sucrose (%) | 0.7 | lower than detection limits |
| Ratio of quinic acid to 3-caffeoylquinic acid | 0.88 | 1.02 |
| Extractability (brew solids, %) | .80 | .64 |
| Aroma (counts/gm.) | 57 | 32 |
| Aroma as a percentage of commercial coffee | 178% | 100% |
| Tamped density (g./cc.) | .392 | .384 |
| Coffee Brew | | |
| Titratable Acidity | 3.5 | 3.5 |

Example VI illustrates the improved holding quality of the coffee brew prepared from the coffee and decaffeinated coffee products of the present invention.

The coffee of the present invention processed as in Examples I and II, a coffee processed conventionally as in Example VI, and a commercial coffee believed to have been conventionally processed in a number similar to Example III were each brewed as in Example V and subjected to expert panel evaluation for taste when freshly brewed and after holding on a warming plate for one hour using the method previously described. The results of a series of hold quality tests indicate the following degree of differences. The ultrafast roasted coffee of the present invention (Example I) had an average degree of difference of 0.4 between the fresh brew and the same coffee held one hour. This represented an average of 8 expert panel tests of 15 experts each. The ultrafast roasted decaffeinated coffee of the present invention (Example II) had an average degree of difference of 0.4 between the fresh brew and the same coffee held one hour. This represented an average of 4 expert panel tests of 10 experts each. The conventionally processed batch coffee of Example IV had an average degree of difference of 0.5 between the fresh brew and the same coffee held one hour. This represented an average of 7 expert panel tests of 15 experts each. The commercial coffee believed to have been conventionally processed in a manner similar to Example III had an average degree of difference of 0.6 between the fresh brew and the same coffee held one hour. This represented an average of two expert panel tests of 18 experts each. A lower degree of difference correlated with increased similarity of the fresh and one-hour old coffee. These results indicated that the ultrafast roasted coffee and ultrafast roasted decaffeinated coffee of the present invention, after each being held for one hour on heat, tasted closer to fresh than did the conventionally processed coffee and the commercial coffee. Thus, the coffee and decaffeinated coffee products of the present invention have improved holding quality.

EXAMPLE VII

Example VII illustrates the less bitter flavor of the coffee brew prepared from the coffee product of the present invention.

The coffee product of the present invention processed as in Example I, a coffee processed conventionally as in Example IV, and conventionally roasted competitive products, commercially available, were tested for flavor. Commercial coffee C is believed to have been conventionally processed in a manner similar to Example III. The coffees were brewed as in Example V using tap water, except that the amount of coffee varied as shown in Tables IV and V. The amount of coffee used to prepare the coffee brew was such that the resulting beverages would have approximately the same brew solids. In the Fresh Coffee Panels all coffees were compared when freshly brewed. In the "Held" Coffee Panels the coffee beverage of the present invention (coffee of Example 1) in an amount of 1500 ml. (10 cups) was held on the warmer of the coffee maker for one hour. This "held" coffee was tested against commercial coffees A, B and C and the coffee of Example IV when freshly brewed.

A blind paired comparison test method was conducted employing 100 persons for each panel. The non-expert panelists were asked to taste two cups of unidentified coffees. They were allowed to add condiments (creamer, sugar, or artificial sweetener) as they normally would, but were required to add the same amounts to each cup. Panelists were also requested to sip water before and after tasting the coffees to clean their taste buds. After tasting the two test coffees, panelists completed a questionnaire indicating which coffee was preferred and which product was considered less bitter.

The results of the panel testing were tabulated to indicate the total percentage of panelists preferring each coffee, and the total percentage of panelists that found one of the test coffees to be less bitter than the other test coffee. The tabulated results are summarized in Tables IV and V. Thus, in the fresh coffee panel 56% of the panelists preferred the coffee of the present invention to coffee A, 62% to coffee B, and 56% to coffee C. The coffee of the present invention was rated as less bitter than coffee A by 62% of the panelists, as less bitter than coffee B by 54% of the panelists, and as less bitter than coffee C by 56% of the panelists. In the "held" coffee panel, the coffee of the present invention after held on heat for 1 hour was preferred by 66% of the panelists to freshly brewed coffee A, by 53% of the panelists to freshly brewed coffee B, by 58% of the panelists to freshly brewed coffee C, and by 64% of the panelists to freshly brewed coffee of Example IV (same blend of coffee beans but batch roasted in conventional manner). The presently claimed "held" coffee was evaluated as less bitter by 67% of the panelists when compared to freshly brewed coffee A, 62% of the panelists when compared to freshly brewed coffee B, 67% of the panelists when compared to freshly brew coffee C, and 60% of the panelists when compared to freshly brewed coffee of Example IV.

TABLE IV

| Fresh Coffee Panels | | | |
|---|---|---|---|
| | Brew usage level (g.) | % of Panel preferring overall | % of Panel indicating less bitter taste |
| Panel 1 | | | |
| Coffee of Example I | 47 | 56 | 62 |
| Commercial Coffee A | 76 | 44 | 38 |
| Panel 2 | | | |
| Coffee of Example I | 40 | 62 | 54 |
| Commercial Coffee B | 57 | 38 | 46 |
| Panel 3 | | | |
| Coffee of Example I | 47 | 56 | 56 |
| Commercial Coffee C | 57 | 44 | 44 |

TABLE V

| "Held" Coffee Panels | | | |
|---|---|---|---|
| | Brew usage level (g.) | % of Panel preferring overall | % of Panel indicating less bitter taste |
| Panel 1 | | | |
| Coffee of Example I | 47 | 66 | 67 |
| Commercial Coffee A | 76 | 34 | 33 |
| Panel 2 | | | |
| Coffee of Example I | 40 | 53 | 62 |
| Commercial Coffee B | 57 | 47 | 38 |
| Panel 3 | | | |
| Coffee of Example I | 47 | 58 | 67 |
| Commercial Coffee C | 57 | 42 | 33 |
| Panel 4 | | | |
| Coffee of Example I | 47 | 64 | 60 |
| Coffee of | 57 | 36 | 40 |

TABLE V-continued

| | "Held" Coffee Panels | | |
|---|---|---|---|
| | Brew usage level (g.) | % of Panel preferring overall | % of Panel indicating less bitter taste |
| Example IV | | | |

What is claimed is:

1. A process for preparing a coffee product comprising:
   (1) roasting green coffee beans in a fluidized bed roaster in from about 30 seconds to about 120 seconds at temperatures of from about 550° F. to 750° F. to a color of from about 19 to about 23 Hunter "L" units, wherein the surfaces of the roasted beans are not more than 10 Hunter "L" units different in color from the average color throughout the beans and wherein the level of fluidization during roasting is from about 9 to about 14 pounds of hot air per pound of green coffee per minute;
   (2) air quenching the roasted coffee to a temperature of less than 300° F. at a level of fluidization of from about 15 to about 20 pounds of air per pound of roasted coffee per minute; and
   (3) grinding the quenched and cooled coffee in a manner such that the overall color of the ground coffee is from about 19 to about 23 Hunter "L" units;
   to yield a coffee which when brewed has improved holding quality.

2. A process according to claim 1 wherein the coffee is roasted at a temperature of from about 600° F. to about 675° F. and at a time of from about 45 seconds to about 90 seconds.

3. A process according to claim 2 wherein the Hunter "L" unit color of the roasted beans and the overall Hunter "L" unit color of ground coffee are from about 19 to about 22.

4. A process according to claim 2 wherein the surfaces of the roasted coffee beans are not more than 3 Hunter "L" units different in color from the average color throughout the beans.

5. A process according to claim 1 wherein the quenching is done by an inert gas.

6. A process according to claim 1 wherein the roasted coffee is air quenched to a temperature of less than about 300° F. in about 20 seconds.

7. A process according to claim 1 which comprises the additional step of spraying water onto the beans after they have been cooled to below about 200° F.

8. A process according to claim 1 which comprises the additional step of milling the ground coffee into flakes.

9. A process according to claim 8 wherein the mechanical static gap of the roll mills is from 0 to about 5 mils during flaking of the coffee.

10. A process according to claim 9 wherein the roll speed is from about 470 ft./min. to about 1880 ft./min., the roll pressure is from about 150 lbs./linear inch of nip to 4000 lbs./linear inch of nip, and the feed rate of the coffee is set to achieve starve feeding.

11. A process according to claim 10 wherein the mill feed particle size distribution comprises:
   (a) from about 40% to about 80% by weight of the composition remains on U.S. Standard sieve size 12;
   (b) from about 20% to about 50% by weight of the composition passes through U.S. Standard sieve size 12 and remains on 16;
   (c) from about 0% to about 20% by weight of the composition passes through U.S. Standard sieve size 16 and remains on 20;
   (d) from about 0% to about 20% by weight of the composition passes through U.S. Standard sieve size 20 and remains on 30;
   (e) from about 0% to about 10% by weight of the composition passes through U.S. Standard sieve size 30.

12. A product made according to claim 1.

13. A product made according to claim 7.

14. A product made according to claim 8.

15. An improved coffee product comprising roast and ground coffee having:
   (a) a minimum sucrose level of 0.5% by weight;
   (b) a minimum ratio of 3-caffeoylquinic acid to caffeine of 0.98; and
   (c) a tamped density of from about 0.34 to about 0.41 g/cc;
   which when brewed generates a coffee brew having a maximum one-hour hold quality degree of difference of 0.4

16. The coffee of claim 15 wherein the ratio of quinic acid to 3-caffeoylquinic acid is a maximum of 0.60.

17. The coffee of claim 15 wherein the extractability as percent weight of brew solids is a minimum of about 0.93.

18. The coffee of claim 17 wherein the coffee brew has a maximum titratable acidity of 4.7.

19. The coffee of claim 18 wherein the coffee brew has a higher level of low molecular weight components in the brew solubles than brews prepared from conventionally processed coffees.

20. The coffee of claim 17 that has been milled into flakes.

21. An improved decaffeinated coffee product comprising decaffeinated roast and ground coffee having:
   (a) a minimum sucrose level of 0.3% by weight; and
   (b) a maximum ratio of quinic acid to 3-caffeoylquinic acid of 0.96; which when brewed generates a coffee brew having a maximum one-hour hold quality degree of difference of 0.4.

22. The coffee of claim 21 wherein the extractability as percent weight of brew solids is a minimum of 0.70.

23. The coffee of claim 21 that has been milled into flakes.

* * * * *